(12) United States Patent
Hirota

(10) Patent No.: US 6,467,821 B2  
(45) Date of Patent: Oct. 22, 2002

(54) BUMPER REINFORCING MEMBER

(75) Inventor: Tomoo Hirota, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/858,720

(22) Filed: May 17, 2001

(65) Prior Publication Data  
US 2001/0054826 A1 Dec. 27, 2001

(30) Foreign Application Priority Data  
May 19, 2000 (JP) .................................. 2000-148331

(51) Int. Cl.[7] ............................................... B60R 19/18  
(52) U.S. Cl. ........................................................ 293/120  
(58) Field of Search ......................................... 293/120

(56) References Cited

U.S. PATENT DOCUMENTS

| | | | |
|---|---|---|---|
| 3,869,167 A | 3/1975 | Muller ........................ | 293/110 |
| 3,876,243 A | 4/1975 | Bell et al. .................... | 293/110 |
| 4,022,505 A | 5/1977 | Saczawa, Jr. ................ | 293/120 |
| 4,105,236 A | 8/1978 | Haar ........................... | 293/110 |
| 4,457,547 A | 7/1984 | Sekiyama et al. ........... | 293/110 |
| 4,492,398 A | 1/1985 | Peter ........................... | 293/102 |
| 4,652,032 A * | 3/1987 | Smith .......................... | 293/120 |
| 4,925,224 A | 5/1990 | Smiszek ...................... | 293/120 |
| 4,941,701 A | 7/1990 | Loren .......................... | 293/155 |
| 5,219,197 A | 6/1993 | Rich et al. ................... | 293/120 |
| 5,727,826 A | 3/1998 | Frank et al. ................. | 293/102 |
| 6,099,055 A | 8/2000 | Hirota et al. ................ | 293/120 |

FOREIGN PATENT DOCUMENTS

| | | |
|---|---|---|
| DE | 2 237 136 | 2/1973 |
| DE | 27 11 277 | 11/1977 |
| JP | 58-89438 | 5/1983 |
| JP | 3-227750 | 10/1991 |
| JP | 6-298018 | 10/1994 |
| JP | 9-226484 | 9/1997 |

* cited by examiner

Primary Examiner—Dennis H. Pedder  
(74) Attorney, Agent, or Firm—Sughrue Mion, PLLC

(57) ABSTRACT

A bumper reinforcing member formed of a resinous material is provided between a bumper fascia and a vehicle body. The reinforcing member includes a plurality of horizontal plates disposed approximately along a horizontal plane and a plurality of vertical plates integrally connected to the horizontal plates and disposed approximately along a vertical plane. A line connecting the position at which an impact is received at the front end of the horizontal plate on the bumper fascia side and a mounting position on the rear of the reinforcing member on the vehicle body side forms an angle with the horizontal plane.

12 Claims, 5 Drawing Sheets

F I G. 3
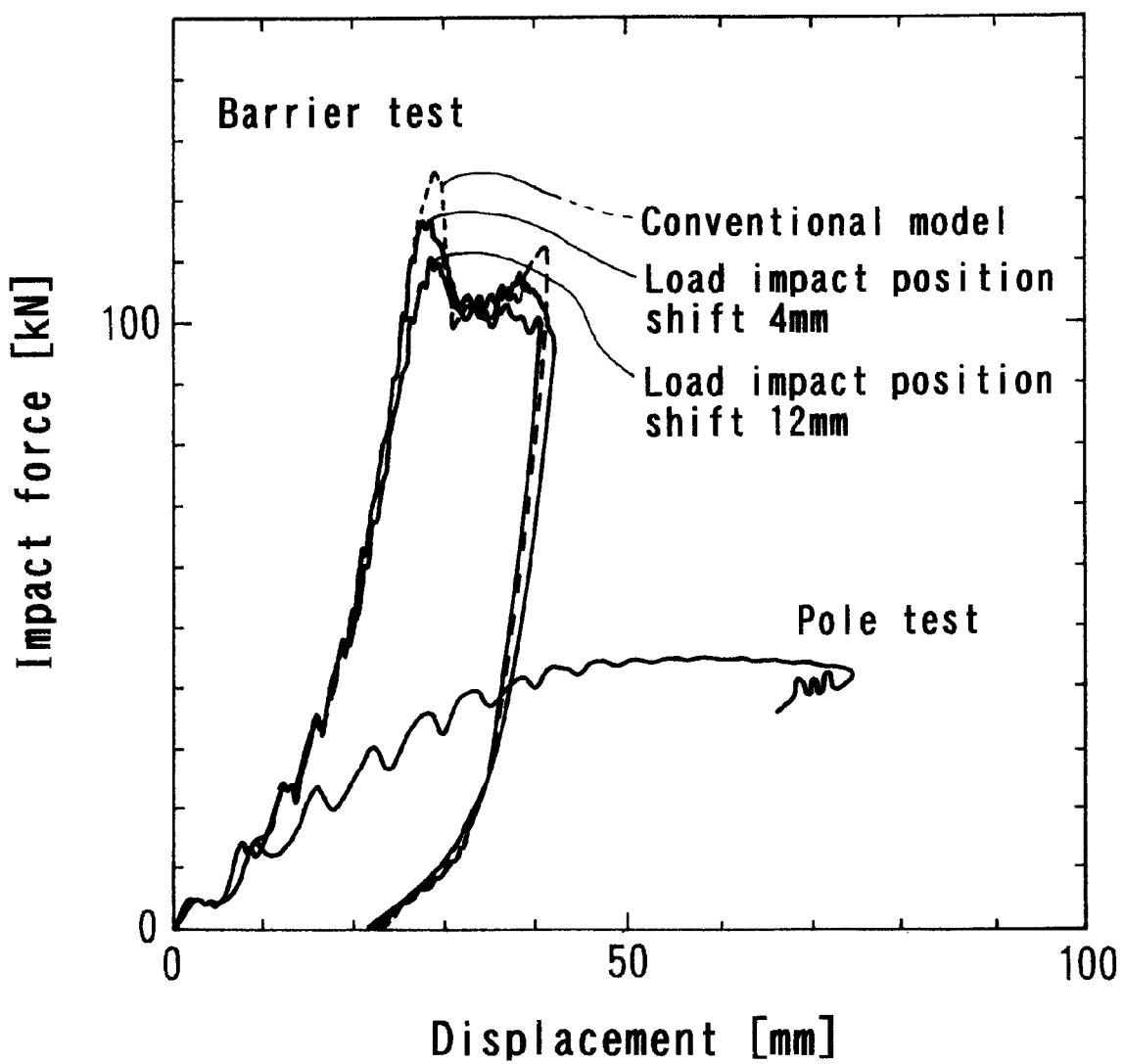

Pole test

Barrier test

BUMPER REINFORCING MEMBER

BACKGROUND OF THE INVENTION

1. Field of the Invention

The present invention relates to a bumper reinforcing member provided on the inner surface side of a vehicle's bumper fascia to absorb impact applied to the bumper.

2. Description of the Related Art

FIG. 4 shows an impact absorbing construction at the front or rear of a passenger vehicle or the like. As shown in the diagram, a bumper fascia 102 is provided on the lower side of a vehicle body 100. A reinforcing member 104 for absorbing impacts is provided between the vehicle and the inside 6f the bumper fascia 102. The reinforcing member 104 is mounted on a side member 108 via a bracket 106. In recent years, resins are being used more and more in place of metal materials to construct the reinforcing member 104 in order to form a more lightweight reinforcing member 104 with better corrosion resistance.

This type of reinforcing member is formed in an arch construction that is expanded in the front center portion. The member is mounted to the vehicle on the widthwise ends. Hence, when an object impacts the bumper, the impact transferred to the vehicle can be alleviated by the elastic deformation of the reinforcing member and further through plastic deformation, which functions to absorb energy.

A resinous bumper reinforcing member of this type is disclosed in Japanese laid-open patent publication No. 2000-52899. This bumper reinforcing member comprises a frame that is open on the front and back surfaces, two partitioning plates that partition the space in the frame into a center space in the widthwise direction of the vehicle and two end spaces, a front surface plate covering the front side of the center space, and rear surface plates covering the rear sides of the end spaces.

Tests performed to learn the impact absorbing capacity of the bumper mainly include a pole test and a barrier test. The pole test, illustrated in FIG. 5A forces a pole 110 having a diameter of 178 mm to collide with the center section of the bumper in a horizontal direction and at a prescribed speed. The barrier test shown in FIG. 5B forces a flat barrier 120 to collide with the entire widthwise surface of the bumper at a prescribed speed. By performing the collisions in each test, it is possible to take measurements of the force received at the mounting parts 130 on the rear end of the reinforcing member 104 and to measure the amount of deformation in the reinforcing member 104 itself. In the pole test, a pole-shaped object is made to collide with the bumper in approximately the center of the bumper in the widthwise direction, applying a force similar to a point load. Therefore, the amount of deformation is great. In the barrier test, a plate-shaped object is collided with the entire front surface of the bumper, applying a force similar to a surface load. Therefore, the load generated at the mounting points is great. As a result, there is demand for a bumper having a satisfactory impact absorbing capacity for both the pole and barrier tests. It is necessary to further improve the balance in impact absorbing capacity for these two tests of different quality from that described in the above application.

SUMMARY OF THE INVENTION

In view of the foregoing, it is an object of the present invention to provide a bumper reinforcing member having sufficient and well-balanced impact absorbing qualities for both point loads and surface loads.

These objects and others will be attained by a bumper reinforcing member formed of a resinous material and provided between a bumper fascia and a vehicle body, the member comprising a plurality of horizontal plates disposed approximately along a horizontal plane; and a plurality of vertical plates integrally connected to the horizontal plates and disposed approximately along a vertical plane. A line connecting a load input position at the front end of the horizontal plate on the bumper fascia side and a mounting position on the rear of the reinforcing member on the vehicle body side forms an angle with the horizontal plane.

In the pole test, the bumper reinforcing member should be able to absorb the concentrated load applied in the front center of the bumper with as little deformation as possible. The bumper reinforcing member of the present invention has high rigidity due to the construction of the horizontal plates that can minimize the amount of deformation in the pole test. In the barrier test, a surface load is applied in the horizontal direction to the front surface of the bumper. In this case, the bumper reinforcing member must soften impact transferred to the vehicle through the highly rigid horizontal plates. In the bumper reinforcing member of the present invention, a line connecting the point in which the load is input and the rear mounting part of the reinforcing member forms an angle with the horizontal plane, enabling the horizontal plates to easily spread and flexibly absorb the surface load. In this way, the bumper reinforcing member of the present invention can provide satisfactory impact absorbing qualities for the barrier test, while maintaining the impact absorbing capacity for the pole test.

According to another aspect of the present invention, the line connecting the load input position to the mounting position is parallel to the horizontal plane near the widthwise center of the bumper reinforcing member but forms an angle with the horizontal plane at the ends of the bumper reinforcing member, the angle growing larger the farther away from the center.

With this construction, the bumper reinforcing member can achieve sufficient capacity for absorbing the concentrated impact by providing horizontal plates along the direction in which the load is applied in the pole test at the center section of the bumper. The line connecting the position of load input on the front end of the bumper reinforcing member and the mounting positions on the rear end form an angle with the horizontal plane that grows larger toward the ends of the bumper reinforcing member. Accordingly, the bumper reinforcing member can flexibly absorb the load on both widthwise ends of the bumper reinforcing member and achieves a well-balanced capacity for absorbing impacts in both the pole test and the barrier test.

Further, the sides of the horizontal plates on the widthwise ends of the bumper reinforcing member are open. With this construction, the bumper reinforcing member can provide flexible impact absorbing properties for surface loads on both widthwise ends of the bumper.

Further, the horizontal plates are configured such that the front ends of the horizontal plates themselves form an angle with the horizontal plane. With this construction, the bumper reinforcing member can be manufactured such that the line connecting the load input position to the mounting positions on the back of the bumper reinforcing member forms an angle with the horizontal plane, that is direction of load input.

According to another aspect of the present invention, extension parts forming an angle with the horizontal plane are added to the front ends of the horizontal plates that are positioned approximately along the horizontal p lane. With this construction, the input position of impact is the front ends of the extension parts that form an angle with the horizontal plane. Therefore, the bumper reinforcing member can be constructed such that the line connecting the load input position to the mounting positions on the rear end forms an angle with the horizontal plane (direction of load input).

According to another aspect of the present invention, vertically extending ribs are added to the front ends of the horizontal plates that are positioned approximately along the horizontal plane. With this construction, it is possible to form an bumper reinforcing member such that the line connecting the input position of impact and the mounting positions on the rear end forms an angle with the horizontal plane (direction of load input).

The above and other objects, features, and advantages of the present invention will be apparent from the following description when taken in conjunction with the accompanying drawings which illustrates preferred embodiments of the present invention by way of example.

BRIEF DESCRIPTION OF THE DRAWINGS

FIGS. 2A, 2B, and 2C are side Views of the bumper reinforcing member showing variations of the preferred embodiment, while

FIG. 3 is a graph showing the results of simulating pole tests and barrier tests;

DETAILED DESCRIPTION OF THE PREFERRED EMBODIMENTS

A bumper reinforcing member according to a preferred embodiment of the present invention will be described while referring to the accompanying drawings.

Figure 1A:
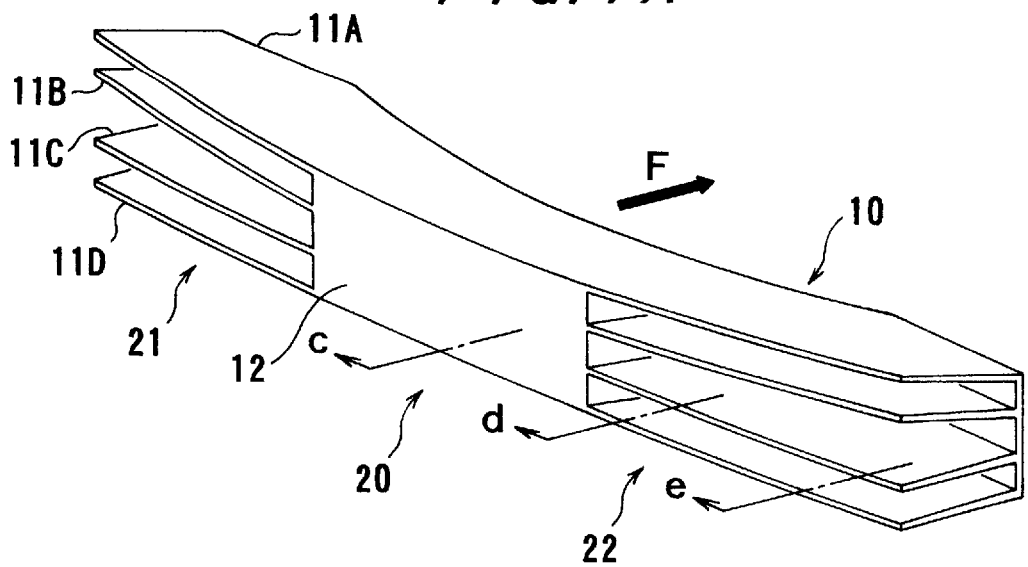
FIGS. 1A through 1E shows a bumper reinforcing member of the preferred embodiment, including a perspective view of the front face by FIG. 1A, a perspective view of the rear face by FIG. 1B, a cross-sectional view indicated by the arrow c by FIG. 1C, a cross-sectional view indicated by the arrow d by FIG. 1D, and a cross-sectional view indicated by the arrow e by FIG. 1E.
Figure 1B:
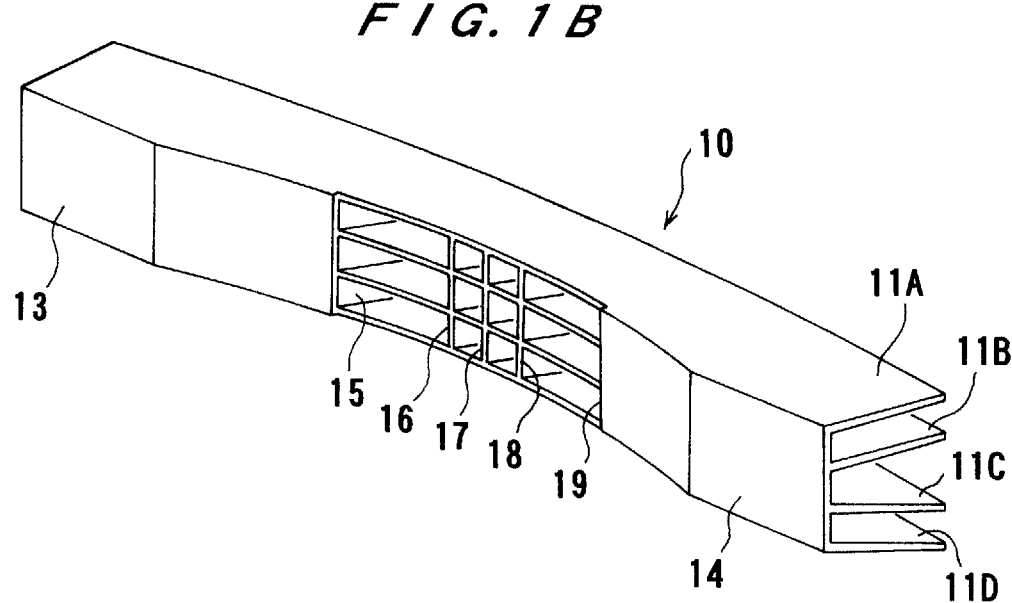
Figure 1C:
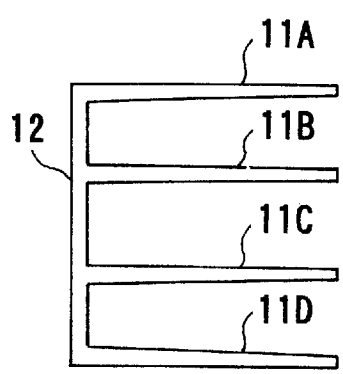

FIG. 1 shows the overall construction of a bumper reinforcing member according to the preferred embodiment and includes a perspective view in FIG. 1A showing the front side, a perspective view in FIG. 1B showing the rear slide, and cross-sectional views in FIG. 1C, D, and E according to the arrows c, d, and e in FIG. 1A. A bumper reinforcing member 10 is configured of four horizontal plates 11A, 11B, 11C, and 11D disposed in an approximate horizontal orientation; and vertical plates 12, 13, 14, 15, 16, 17, 18, and 19 that are integrally formed with the horizontal plates. The vertical plate 12 is provided on the bumper fascia side and comprises a front face plate opposing the load input direction F in which an impact force is applied. The vertical plates 13 and 14 are disposed on the vehicle body side and comprise rear face plates also opposing the load input direction F.

The vertical plates 15 and 19 serve as partition plates for partitioning the bumper reinforcing member 10 in the widthwise direction of the vehicle body to form a center section 20 and end sections 21 and 22. With this construction, the center section 20 is open on the rear side and includes four horizontal plates connected to the vertical plate 12. The end sections 21 and 22, on the other hand, are open on the front side and each has four horizontal plates connected to the vertical plates 13 and 14. Similarly, the vertical plates 16, 17, and 18 are disposed parallel to the load input direction F. Along with the horizontal plates, the vertical plates 16, 17, and 18 serve to absorb impact in the center section 20. The bumper reinforcing member 10 expands in the center section toward the front face to form an arch similar to the the construction disclosed in Japanese laid-open patent publication No. 2000-52899 mentioned above. The ends of the horizontal plates in the widthwise direction of the vehicle are open.

This bumper reinforcing member 10 can be molded into a single integrated unit using a normal injection molding method well known in the art. The center section 20 partitioned by the vertical plates 15 and 19 is closed on the front face by the vertical plate 12, but is open on the rear face. Similarly, the end sections 21 and 22 are closed on the rear face by the vertical plates 13 and 14, but open on the front face. Therefore, the bumper reinforcing member 10 can be molded as a single integrated unit by drawing the core of the bumper reinforcing member 10 out through the openings. As shown in FIGS. 1C, D, and E, the horizontal plates and vertical plate are formed thinner on the open ends in order to facilitate drawing from the mold following the injection molding process.

Figure 1D:
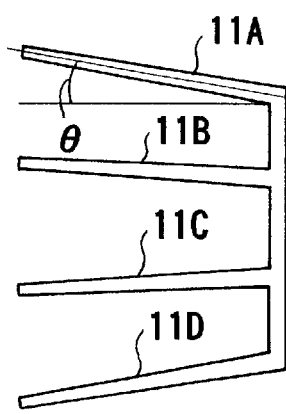
Figure 1E:
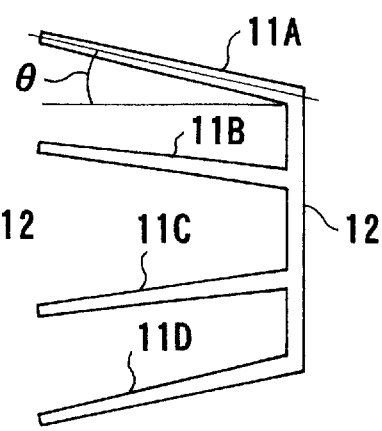

In the center section 20 of the bumper reinforcing member 10, the horizontal plates 11A, 11B, 11C, and 11D are disposed approximately along the horizontal plane, but form an angle with the horizontal plane at the end sections 21 and 22. That is, at the center section 20, shown in FIG. 1C, the horizontal plates 11A and 11D are approximately level with the horizontal plane, conforming to the load input direction F in which a force of impact is applied. These plates receive such impact from the front surface. As shown in FIGS. 1D and E, the horizontal plates 11A and 11D expand outward to form an angle with the horizontal plane in the end sections 21 and 22 that grows larger toward the end of the bumper reinforcing member 10 in the widthwise direction of the vehicle. Here, the horizontal plane is defined that the horizontal plane is level when the bumper reinforcing member 10 is mounted in the body of the vehicle.

Figure 5A:
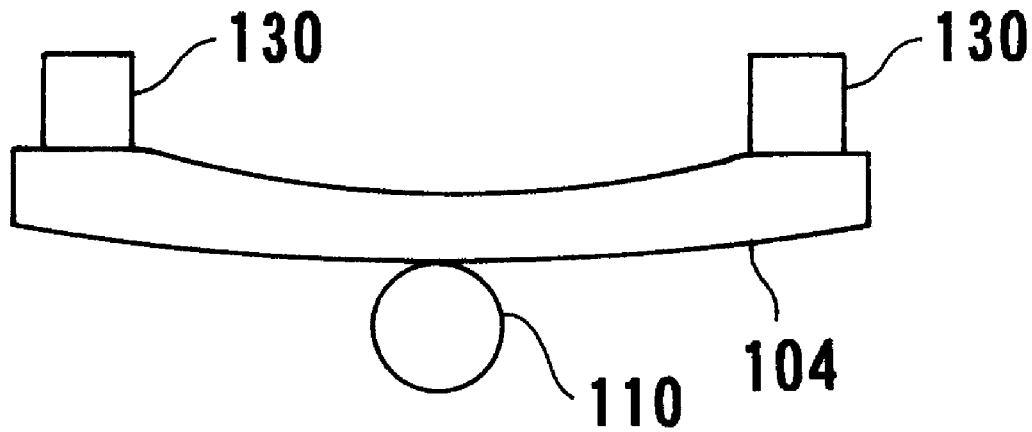
FIGS. 5A and 5B are explanatory diagrams illustrating the pole test and barrier test, respectively.

Next, the impacts absorbing operations of this bumper reinforcing member are described. In the pole test described above and illustrated in FIG. 5A, an impact force in the load input direction F is applied as a concentrated load to the front surface of the center section 20 of the bumper reinforcing member 10, that is, the vertical plate 12. Since this center section 20 includes the horizontal plates 11A, 11B, 11C, and 11D are disposed approximately level with the horizontal plane and the horizontal plates 11A, 11B, 11C, and 11D as well as the vertical plates 16, 17, and 18 are lined up in parallel in the load input direction F, these plates receive the impact from the front and buckle to absorb the impact. Hence, a bumper reinforcing member of this construction demonstrates a satisfactory capacity for absorbing impacts by a concentrated load in the pole test.

Figure 5B:
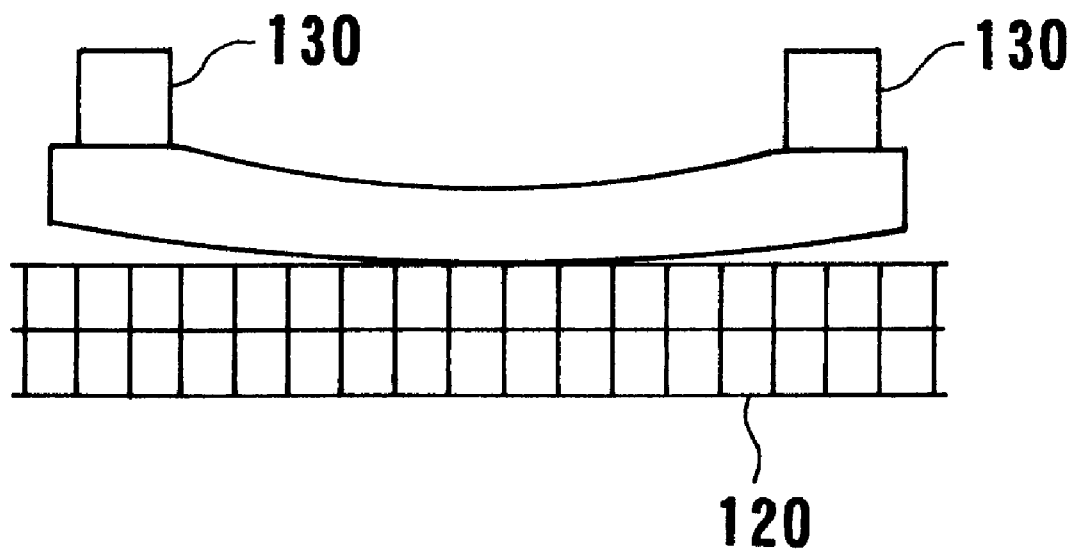

When a surface force is applied to the bumper, such as the force in the barrier test shown in FIG. 5B, the horizontal and vertical plates are too rigid, if these plates are disposed parallel to the direction of the force. In the present invention, therefore, a line L connecting a load input position on the front end of the horizontal plates on the bumper fascia side and a mounting position on the rear end of the bumper reinforcing member on the vehicle side forms an angle θ with the horizontal plane. Accordingly, rather than absorbing an impact from the front, in relation to the load input direction F, the horizontal plates 11A, 11B, 11C, and 11D receive the impact from a direction slightly off the load input direction F, thereby softening the impact and encouraging the plates to deform. The angle θ is designed to grow larger toward the ends of the bumper reinforcing member 10 in the widthwise direction of the vehicle to enable the bumper reinforcing member 10 to absorb a surface force evenly across the entire bumper reinforcing member 10.

Figure 2A:
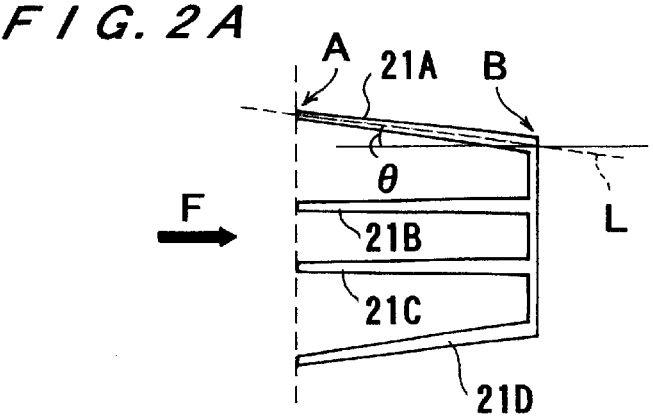
Figure 2B:
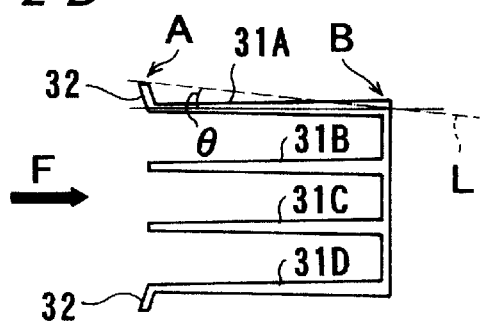
Figure 2C:
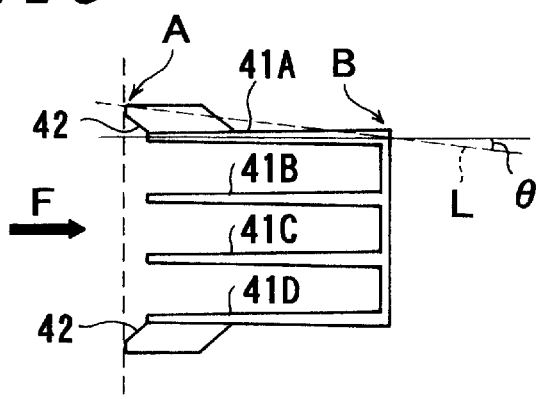
Figure 2D:
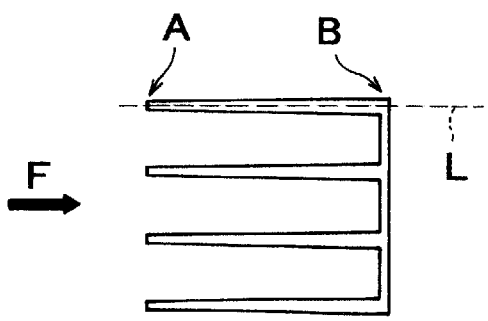
FIG. 2D is a side view of a conventional bumper reinforcing member provided for comparison.
Figure 4:
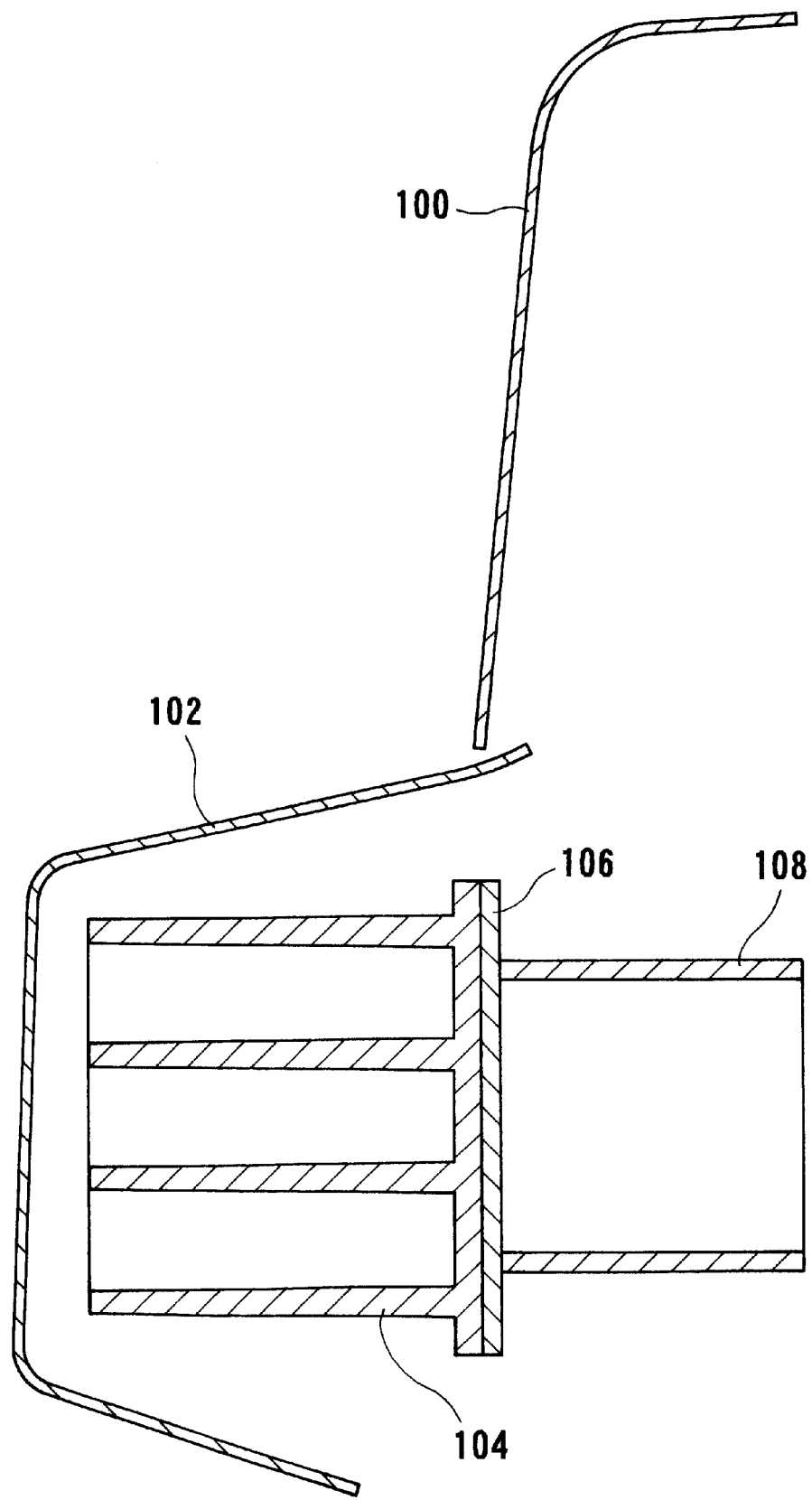
FIG. 4 is a side cross-sectional view showing an impact-absorbing construction for a vehicle bumper.

FIGS. 2A, B, and C shows various constructions of the horizontal plates according to the present invention, while FIG. 2D shows a conventional construction for the purposes of comparison. In FIG. 2A, horizontal plates 21A through 21D themselves serve as the front ends onto which the load is input. The top and bottom two horizontal plates 21A and 21D form an angle with the horizontal plane, while the inner plates 21B and 21C are even with the horizontal plane, as in the conventional example of FIG. 2D. With this configuration, the bumper reinforcing member 10 can adequately achieve impact absorbing properties against a surface force, particularly because the plates 21A and 21D are flexible and buckle on impact. In FIG. 2B, four horizontal plates 31A through 31D are disposed approximately level with the horizontal plane with one vertical plate fixed on the rear end of the horizontal plates and integrally formed therewith, as in the conventional construction of FIG. 2D. In addition, extension parts 32 forming an angle with the horizontal plane are added to the front ends of the plates 31A and 31D. Accordingly, the line L connecting the position A at which a load is input on the bumper fascia side of the horizontal plates and the mounting position B on the rear end on the vehicle side forms an angle with the horizontal plane (the load input direction F), thereby achieving sufficient impact absorbing properties for a surface force.

In FIG. 2C, four horizontal plates 41A through 41D are disposed approximately level with the horizontal plane, as in the conventional construction. However, ribs 42 extending in the vertical direction are added to the top and bottom horizontal plates 41A and 41D. As a result, the line L connecting the load input position A and the mounting position B forms an angle θ with the horizontal plane, there achieving sufficient impact absorbing properties for a surface force.

Next, the results of a computer simulation using the finite element method to study the impact absorbing property of the bumper reinforcing member according to the present invention will be described. The impact tests in which simulations were conducted includes a pole test for measuring the size of the impact force and the amount of deformation when the front center section of the experiment sample collides with a pole; and a barrier test for measuring the size of the impact force and the amount of deformation when the entire front of the experiment sample collides with a flat barrier. In the pole tests, a pole having a diameter of 178 mm and a weight of 1,000 kg was collided approximately into the front center section of the experiment sample at a speed of 8 km/hr, while the size of the impact force and the amount of deformation were measured. In the barrier tests, a flat barrier weighing 1,000 kg was collided into the front surface of the experiment sample at a speed of 8 km/hr, while the size of the impact force and the amount of deformation were measured. Here, the amount of deformation denotes the amount of deformation in the load input direction F measured after the pole or flat barrier impacts the test sample. The impact force is defined as the force received by the mounting parts of the sample.

A bumper reinforcing member having the construction shown in FIG. 1 was used as the test sample. The overall width of the sample in the widthwise direction off the vehicle was 1,200 mm. The span of the arch portion, excluding the vehicle mounting portion on the rear side was 800 mm. The vertical plate 12 had a width of 400 mm and a height of 100 mm. The vertical plate 17 was disposed in the widthwise center section of the bumper reinforcing member 10, while the vertical plates 16 and 18 were disposed parallel to and separated by about 50 mm from the vertical plate 17. The depth of the bumper reinforcing member 10 in the load input direction F was 100 mm both at the center section and the end sections, while the widest section of the vehicle mounting unit measured 107 mm. Here, the horizontal plates 11A and 11B are parallel in the center section and gradually point upward toward the ends of the end sections to form an angle with the horizontal. The horizontal plates 11C and 11D are also parallel in the center section and gradually point downward toward the ends of the end sections to form an angle with the horizontal. The resinous material used to form this construction is a polypropylene resin that is resistant to impacts, such as a propylene-ethylene block copolymer.

The software used for analysis was LS-DYNA (version 9.40) developed by Livermore Software Technology Corporation. Simulations were conducted using the Cowper-Symonds equation for material property shown below.

$$\sigma_y = \sigma_{y0}[1+(\epsilon/C)^{1/P}]$$

Here, σ is yield stress, $\sigma_{y0}$ is static yield stress, ε is strain rate, and C and P are parameters. Table 1 shows the parameters and physical properties.

TABLE 1

| Parameters and Physical Properties | | | | |
|---|---|---|---|---|
| Cowper-Symonds parameters | | Static yield stress | Elastic modulus | Specific gravity |
| C[1/s] | P[−] | $\sigma_{y0}$[Mpa] | E[Mpa] | [−] |
| 81.5 | 3.70 | 21.0 | 991 | 0.90 |

FIG. 3 shows the amount of deformation in relation to impact force in the above experiments. The experiments were performed to compare a conventional shape in which no angle is formed between the load input position and the mounting position on the rear end, a shape having an angle θ formed by moving the load input position about 4 mm off the horizontal position on both ends of the bumper reinforcing member, and a shape wherein an even larger angle θ is formed by further moving the load input position off the horizontal by about 12 mm. The length of the experiment sample in the load input direction is about 100 mm. The tan θ on the ends of the bumper reinforcing member is 0.04 and 0.12 respectively.

Based on the simulation results of the pole tests, the amount of deformation was 75.0 mm in the conventional model, 74.9 mm when the load input position was shifted 4 mm, and 75.1 mm when the load input position was shifted 12 mm. From these results, it can be determined that there is very little variation in the amount of deformation in the pole test when shifting the load input position. There is also little difference in the measured impact.

In contrast, the size of impact measured in the barrier test when the load input position was not shifted (the conventional model) was as large as 123 kN. This amount dropped to 117 kN when the load input position was shifted 4 mm from the horizontal and further dropped to 111 kN when the load input position was shifted 12 mm from the horizontal. Accordingly, it can be seen that shifting the load input position reduces the amount of impact force.

In other words, the impact from the barrier test can be reduced by forming an angle between the horizontal plane and the line L connecting the load input position and the mounting position on the horizontal plate, the reduction increasing as the angle becomes larger. Hence, this construction can improve the impact absorbing property of the bumper reinforcing member. On the other hand, the impact in the pole test does not change regardless of whether the horizontal plate is shifted or not. With the construction of the bumper reinforcing member shown in FIG. 1, it is therefore possible to improve the impact absorbing property in the barrier test (surface load), while maintaining the impact absorbing property for the pole test (point load).

Next, the resin material used to construct the bumper reinforcing member will be described. The bumper reinforcing member of the present invention is manufactured of a resinous material that is not limited to any particular type of resin, providing the material can serve as a reinforcing member. The bumper reinforcing member may be made of a material comprising an olefin based resin or an olefin based resin composition. Because the olefin based resins have lower specific gravity compared with other resins, the unit can be made light weight. Same considerations apply for olefin based resin compositions.

Olefin based resins are not particularly limited and may include homopolymers of $\alpha$-olefin, such as ethylene, propylene, butene-1, pentene-1, hexenel1, 3-methylbutene-1, 4-methylpentene-1, or copolymers made of the foregoing $\alpha$-olefin(s) with other unsaturated monomers. Or, other copolymers are possible, which are comprised by at least two kinds of monomers selected from $\alpha$-olefin, having more than three carbons, and ethylene. These substances may be:used singly or in combination.

Of the substances mentioned above, high-density polyethylene, medium-density polyethylene, low-density polyethylene, linear polyethylene, ethylene-vinyl acetate copolymer, ethylene based resins such as ethylene-ethylacrylate copolymer, and propylene based, resins, such as isotactic polypropylene, syndiotactic polypropylene and propylene-ethylene block copolymer, are preferable. Propylene resins are most preferable.

Also, other olefin based resin compositions which can be used are those containing at least one thermoplastic elastomer and/or at least one inorganic filler.

Thermoplastic elastomer may include olefin based elastomers or styrene based elastomers. Olefin based elastomers may include ethylene-propylene copolymer rubber, ethylene-propylene non-conjugated diene based copolymer rubber, ethylene-butene-1 copolymer rubber, ethylene-butene-1 non-conjugated diene based copolymer rubber, propylene-butadiene copolymer rubber, ethylene-octene based copolymer, and other amorphous random olefin based elastomers containing chiefly olefin. Non-conjugate dienes include dicyclopentadiene, 1, 4-hexadiene, cyclooctadiene, methyl norbornene, ethlidene norbornene.

Styrene based elastomers include styrene-butadiene block copolymer, styrene-isoprene block copolymer, hydrogenated styrene-isoprene block copolymer, styrene grafted ethylene-propylene copolymer rubber, styrene grafted ethylene-propylene non-conjugated diene copolymer rubber, styrene-ethylene-butylene-styrene block copolymer rubber.

Inorganic fillers that can be incorporated into the resins include talc, mica, wollastonite, calcium carbonate, barium sulphate, magnesium carbonate, clay, alumina, silica, calcium sulphide, carbon fibers, glass fibers, metal fibers, titanium oxide, carbon black, magnesium hydroxide, and diatomaceous earth.

Additives to the resin or resin compositions include antioxidant agents, ultraviolet absorbing agents, lubricants, pigments, antistatic agents, copper corrosion inhibitors, neutralizers and nucleating agents.

In the embodiment described above, the bumper reinforcing member is described as having four horizontal plates. However, it is obvious that the number of plates should be adjusted to an appropriate number with consideration for the impact absorbing requirements. This is also true for the number of vertical panels, which are arranged parallel to the load input direction. Further, the horizontal panels in the center portion of the bumper reinforcing member shown in FIG. 1 are arranged level with the horizontal and may form an angle with the horizontal plane that gradually grows larger toward the ends. However, the horizontal plates in the center section can also form an angle with the horizontal. Both ends of the bumper reinforcing member in the preferred embodiment are open. However, vertical plates can also be provided on the ends. In this way, many modifications and variations to the preferred embodiment may be made without departing from the spirit of the invention.

The bumper reinforcing member according to the present invention can reduce the amount of impact during the barrier test (surface load), while maintaining satisfactory impact absorbing properties for the pole test (point load). By using a resin material, it is possible to form the bumper reinforcing member in one integrated piece through injection molding, injection/pressure molding, pressure molding, and the like, thereby achieving a lightweight product with lower production costs.

Although certain preferred embodiments of the present invention have been shown and described in detail, it should be understood that various changes and modifications may be made therein without departing from the scope of the appended claims.

What is claimed is:

1. A bumper reinforcing member formed of a resinous material and provided between a bumper fascia and a vehicle body, the member comprising:

a plurality of horizontal plates having a center section and front end sections wherein the center section is disposed approximately along a horizontal plane; and a plurality of vertical plates integrally connected to the horizontal plates and disposed approximately along a vertical plane;

wherein a line connecting a load input position at a front end of a horizontal plate on the bumper fascia side of the reinforcing member to a mounting position on a rear end of a horizontal plate of the reinforcing member on the vehicle body side forms an angle with the horizontal plane.

2. A bumper reinforcing member formed of a resinous material and provided between a bumper fascia and a vehicle body, the member comprising:

a plurality of horizontal plates having a center section and front end sections wherein the center section is disposed approximately along a horizontal plane; and a plurality of vertical plates integrally connected to the horizontal plates and disposed approximately along a vertical plane;

wherein a line connecting a load input position at a front end of a horizontal plate on the bumper fascia side of the reinforcing member to a mounting position on the rear end of a horizontal plate of the reinforcing member on the vehicle body side is parallel to the horizontal plane near a widthwise center of the bumper reinforcing member but forms an angle with the horizontal plane at the ends of the bumper reinforcing member, the angle growing larger the farther away from the widthwise center of the bumper reinforcing member.

3. A bumper reinforcing member as recited in claim 1, wherein the plates diverge from horizontal at ends of the member and sides of the horizontal plates on the widthwise ends of the bumper reinforcing member are open.

4. A bumper reinforcing member as recited in claim 1, wherein the horizontal plates are configured such that the front ends of the horizontal plates themselves form an angle with the horizontal plane.

5. A bumper reinforcing member as recited in claim 1, wherein extension parts forming an angle with the horizontal plane are added to the front ends of the horizontal plates that are positioned approximately along the horizontal plane.

6. A bumper reinforcing member as recited in claim 1, wherein vertically extending ribs are added to the front ends of the horizontal plates that are positioned approximately along the horizontal plane.

7. A bumper reinforcing member as recited in claim 1 wherein the center section is open on the rear side.

8. A bumper reinforcing member as recited in claim 2, wherein the sides of the horizontal plates on the widthwise ends of the bumper reinforcing member are open.

9. A bumper reinforcing member as recited in claim 2, wherein the horizontal plates are configured such that the front ends of the horizontal plates themselves form an angle with the horizontal plane.

10. A bumper reinforcing member as recited in claim 2, wherein extension parts forming an angle with the horizontal plane are added to the front ends of the horizontal plates that are positioned approximately along the horizontal plane.

11. A bumper reinforcing member as recited in claim 2, wherein vertically extending ribs are added to the front ends of the horizontal plates that are positioned approximately along the horizontal plane.

12. A bumper reinforcing member as recited in claims 2, wherein the center section of the horizontal plates is open on the rear side.

* * * * *